Feb. 7, 1950           K. A. HILL           2,496,942

CALCULATING DEVICE

Filed Oct. 16, 1945

KEITH A. HILL,
INVENTOR.

BY Clifford C. Bradbury

ATTORNEY.

Patented Feb. 7, 1950

2,496,942

UNITED STATES PATENT OFFICE 2,496,942

CALCULATING DEVICE

Keith A. Hill, Rockford, Ill.

Application October 16, 1945, Serial No. 622,536

1 Claim. (Cl. 235—88)

My invention relates to a calculating device for indicating the hours of the day and night during which fish are most likely to be feeding. The device is termed a "fisherman's slide rule."

The slide rule of my invention is based upon the theory that fish feed during the periods of high tide. When the previous high tide has receded, it has left sea creatures stranded upon the sands to be again picked up at or near the following high tide. Over the millions of years, fish have learned that the waters contain food at high tide and the habit of feeding during the high tide hours has been instilled into the present generation even of fresh water fish from their salt water ancestry.

An object of my invention is to provide ready means, particularly at locations away from the oceans, by which one may readily determine the fish feeding periods by his own observations, and without actual knowledge of the conditions of the tides.

My invention is illustrated in the accompanying drawings, in which

Figure 1:
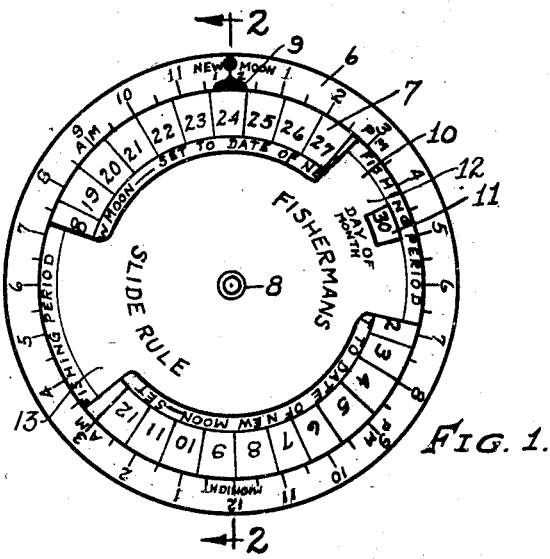
Figure 2:
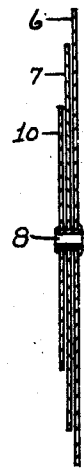
Figure 4:
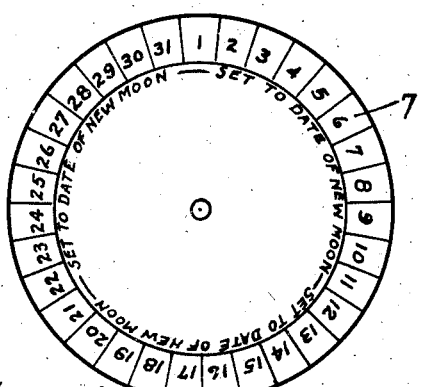
Figure 3:
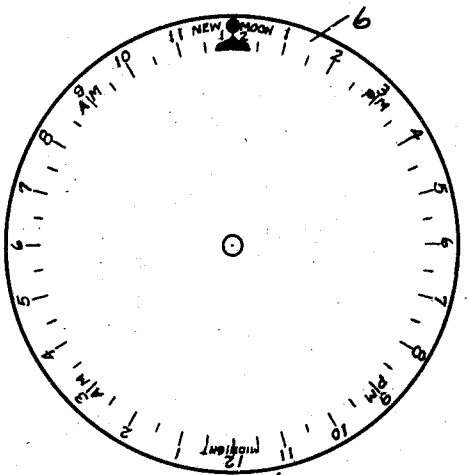
Figure 5:
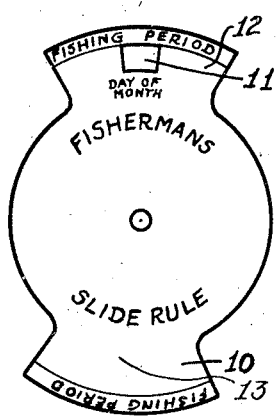

Fig. 1 is a plan view of the assembled device.
Fig. 2 is a section on the line 2—2 of Fig. 1.
Fig. 3 is a plan of the largest or base disc.
Fig. 4 is a plan of the intermediate disc, and
Fig. 5 is a plan of the upper or outer disc.

The fisherman's slide rule of my invention may be made of any suitable material, and comprises a base disc 6, divided circumferentially into twenty-four equal divisions, representing the hours of the day and night, the divisions being marked with numerals from 1 to 12 in each of two semi-circles. Adjacent the base disc 6 is an intermediate disc 7, pivoted as by the grommet 8, with its center on the axis of the disc 6. The disc 7 is of sufficiently less diameter than the disc 6 to expose the numerals representing the time of day outside the circumference of the disc 7, and also to expose an indicator 9, marked or printed upon, or otherwise attached to the disc 6 at the twelve o'clock, noon, position. The circumference of the disc 7 is divided into thirty-one equal parts, numbered from 1 to 31, which is a convenient approach to the days of a lunar month. The base of the indicator 9, adjacent the circumference of the disc 7, is of a width substantially equal to the space assigned to one day on the circumference of the disc 7. The outer disc 10, also pivoted with its center at the center of the discs 6 and 7, is preferably formed with two segmental portions 12 and 13, the peripheries of which are equal in diameter to that of the disc 7, and intermediate portions of less diameter than the disc 7 in order that most of the figures representing the days of the month will be exposed. A window 11, in one of the large diameter portions of the disc 10, exposes any one of the days of the month over which it is placed by turning the disc 10 on the grommet 8. Adjacent the window 11, the words "Day of month" are inscribed, and on the disc 7, beyond the diameter of the small diameter portion of the disc 10, the words "Set to date of new moon" are inscribed.

Since there is approximately thirty minutes' difference in tide periods for each twelve hours' difference in time, the corresponding edges of the segments 12 and 13 are spaced apart in a clockwise direction approximately twelve hours and thirty minutes.

In the use of my invention, one wishing to determine the best fishing hours moves the dial 7 upon the base dial 6 until the indicator 9 is opposite the day of the month upon which a new moon first appeared. He then moves the dial 10 until the day of the month on which the fishing is to take place appears under the window 11. He then reads the hours of the day or night around the circumference of the disc 6, opposite the large diameter portions of the disc 10, which for convenience are each marked "Fishing period." In the device here illustrated, each fishing period continues for four hours. The period, of course, may be shortened or lengthened without departing from the scope of my invention. If, by reason of employment, a fisherman desires to determine the days of the month when fishing may be expected to be good at any particular time of day, he may set the center of the "Fishing period" indicator at the time of day and read the best fishing day of the month through the window 11.

This device in reality indicates sun time rather than standard time, but the spread of the fishing period is sufficient to cover the best hours of fishing, whether standard or sun time is used. Inasmuch as the moment of high tide moves progressively from east to west at the same rate as the earth's rotation, the indications of best fishing period will be correct for any longitude.

I claim:

In an indicating apparatus, an outer disc provided with a circle of designations, an intermediate disc of less diameter than the outer disc concentrically mounted for rotation on said outer disc and provided adjacent its margin with a circle of designations adjacent the circle of designations on the outer disc, an indicator on the outer disc by means of which the intermediate disc may be set with any of its designations opposite the indicator, and an inner disc concentrically mounted for rotation with respect to the outer and intermediate discs and comprising an inner portion of a diameter to expose a plurality of designations on the intermediate disc to facilitate its setting and having two substantially opposite and substantially equal segments the outer edges of which are of a diameter and curvature to cover some of the designations on the intermediate disc, each segment having circumferentially spaced parts indicating limits of designations on the outer disc, an indicator for one of said segments for locating it in a definite position with respect to designations on the intermediate disc, the spaced parts for the opposite segment for indicating limits of designations on the outer disc being slightly more than 180 degrees in a clockwise direction from the corresponding spaced parts of the segment carrying the indicator by which the inner disc is located.

KEITH A. HILL.

REFERENCES CITED

The following references are of record in the file of this patent:

UNITED STATES PATENTS

| Number | Name | Date |
|---|---|---|
| 915,254 | Volkmar | Mar. 16, 1909 |
| 1,171,753 | Serrell | Feb. 15, 1916 |
| 1,405,847 | Johnson | Feb. 7, 1922 |